(12) United States Patent
Yokouchi et al.

(10) Patent No.: US 9,515,316 B2
(45) Date of Patent: Dec. 6, 2016

(54) METHOD FOR PRODUCING ANODE ACTIVE MATERIAL FOR SECONDARY BATTERY, ANODE ACTIVE MATERIAL FOR SECONDARY BATTERY, METHOD FOR PRODUCING ANODE FOR SECONDARY BATTERY, ANODE FOR SECONDARY BATTERY, AND SECONDARY BATTERY

(71) Applicant: SHOWA DENKO K.K., Minato-ku, Tokyo (JP)

(72) Inventors: Hitoshi Yokouchi, Tokyo (JP); Masahiro Ohmori, Tokyo (JP); Chiaki Sotowa, Tokyo (JP); Masayuki Sanbayashi, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 106 days.

(21) Appl. No.: 14/396,128

(22) PCT Filed: Apr. 22, 2013

(86) PCT No.: PCT/JP2013/061744
§ 371 (c)(1),
(2) Date: Oct. 22, 2014

(87) PCT Pub. No.: WO2013/161748
PCT Pub. Date: Oct. 31, 2013

(65) Prior Publication Data
US 2015/0287983 A1    Oct. 8, 2015

(30) Foreign Application Priority Data

Apr. 27, 2012   (JP) .................................. 2012-102724

(51) Int. Cl.
*H01M 4/36*      (2006.01)
*H01M 4/485*     (2010.01)
(Continued)

(52) U.S. Cl.
CPC .............. *H01M 4/366* (2013.01); *C23C 22/23* (2013.01); *C23C 22/77* (2013.01); *C23C 22/80* (2013.01);
(Continued)

(58) Field of Classification Search
CPC .......... C23C 22/23; C23C 22/77; C23C 22/80; C23C 22/82; H01M 10/0525; H01M 2004/027; H01M 4/0404; H01M 4/131; H01M 4/136; H01M 4/1391; H01M 4/1397; H01M 4/366; H01M 4/485; H01M 4/5852; H01M 4/661; Y02E 60/122; Y02P 70/54; Y02T 10/7011
See application file for complete search history.

(56) References Cited

U.S. PATENT DOCUMENTS

2002/0160910 A1*  10/2002  Sanbayashi ............ B01J 21/063
                                                              502/208
2012/0153225 A1*   6/2012  Ko ........................ C01G 23/005
                                                              252/301.4 P

FOREIGN PATENT DOCUMENTS

CN    102148351 A    8/2011
CN    102376948 A    3/2012
(Continued)

OTHER PUBLICATIONS

Zhang et al., "A novel preparation of titanium dioxide from titanium slag", Hydrometallurgy 96 (2009), pp. 52-56.
(Continued)

*Primary Examiner* — Carlos Barcena
(74) *Attorney, Agent, or Firm* — Sughrue Mion, PLLC (57) ABSTRACT

This method for producing an anode active material for a secondary battery is provided with a step for forming titanium dioxide by means of hydrolysis by adding a titanium-containing compound to an acidic aqueous solution,
(Continued)

and furthermore, by means of adding a compound containing an alkaline earth metal and a condensed phosphate, the surface of the titanium dioxide is covered by the condensed phosphate containing the alkaline earth metal in a manner so that the amount of elemental phosphorus atoms and the amount of alkaline earth metal are each in the range of 0.1 to 10 mass % with respect to the mass of titanium dioxide, thus synthesizing the anode active material (12).

10 Claims, 1 Drawing Sheet

(51) Int. Cl.

| | |
|---|---|
| C23C 22/82 | (2006.01) |
| C23C 22/23 | (2006.01) |
| C23C 22/80 | (2006.01) |
| C23C 22/77 | (2006.01) |
| H01M 4/131 | (2010.01) |
| H01M 4/04 | (2006.01) |
| H01M 4/1391 | (2010.01) |
| H01M 4/136 | (2010.01) |
| H01M 4/1397 | (2010.01) |
| H01M 4/58 | (2010.01) |
| H01M 4/66 | (2006.01) |
| H01M 10/0525 | (2010.01) |
| H01M 4/02 | (2006.01) |

(52) U.S. Cl.
CPC ............ *C23C 22/82* (2013.01); *H01M 4/0404* (2013.01); *H01M 4/131* (2013.01); *H01M 4/136* (2013.01); *H01M 4/1391* (2013.01); *H01M 4/1397* (2013.01); *H01M 4/485* (2013.01); *H01M 4/5825* (2013.01); *H01M 4/661* (2013.01); *H01M 10/0525* (2013.01); *H01M 2004/027* (2013.01); *Y02E 60/122* (2013.01)

(56) References Cited

FOREIGN PATENT DOCUMENTS

| EP | 2 472 527 A1 | 7/2010 |
|---|---|---|
| EP | 2 284 235 A1 | 2/2011 |
| EP | 2 471 869 A1 | 7/2012 |
| EP | 2 472 527 A1 | 7/2012 |
| EP | 2 472 646 A1 | 7/2012 |
| JP | 9-204937 A | 8/1997 |
| JP | 3256801 B2 | 2/2002 |
| JP | 2002-134103 A | 5/2002 |
| JP | 2007-226969 A | 9/2007 |
| JP | 2008-60060 A | 3/2008 |
| JP | 2008-117625 A | 5/2008 |
| JP | 2008-300204 A | 12/2008 |
| JP | 2009-170132 A | 7/2009 |
| JP | 2009-176540 A | 8/2009 |
| JP | 2009-277660 A | 11/2009 |
| JP | 4393610 B2 | 1/2010 |
| JP | 2010-212167 A | 9/2010 |
| JP | 2011-14368 A | 1/2011 |
| JP | 2011-173761 A | 9/2011 |
| JP | 4799275 B2 | 10/2011 |
| JP | 2012-028026 A | 2/2012 |
| JP | 2012-38680 A | 2/2012 |
| WO | 02/053285 A1 | 7/2002 |
| WO | 2008/114667 A1 | 9/2008 |
| WO | 2009/147989 A1 | 12/2009 |
| WO | 2011/024797 A1 | 3/2011 |
| WO | 2011/024798 A1 | 3/2011 |
| WO | 2011/024799 A1 | 3/2011 |
| WO | 2012/029328 A2 | 3/2012 |

OTHER PUBLICATIONS

Communication dated Nov. 4, 2015 from the European Patent Office issued in corresponding application No. 13782281.3.
International Search Report for PCT/JP2013/061744 dated Jul. 23, 2013.
Communication dated Dec. 29, 2015 from the State Intellectual Property Office of the P.R.C. in counterpart application No. 201380021499.8.
Qiao et al., "Phosphatization: A promising approach to enhance the performance of mesoporous $TiO_2$ anode for lithium ion batteries," Elsevier, Electrochemistry Communications 10 (2008) 616-620.
Communication dated Jul. 15, 2016, issued by the Korean Intellectual Property Office in corresponding Korean Application No. 10-2014-7030076.

* cited by examiner

METHOD FOR PRODUCING ANODE ACTIVE MATERIAL FOR SECONDARY BATTERY, ANODE ACTIVE MATERIAL FOR SECONDARY BATTERY, METHOD FOR PRODUCING ANODE FOR SECONDARY BATTERY, ANODE FOR SECONDARY BATTERY, AND SECONDARY BATTERY

TECHNICAL FIELD

The present invention relates to a method for producing an anode active material for a secondary battery, and an anode active material for a secondary battery; a method for producing an anode for a secondary battery, and an anode for a secondary battery; and a secondary battery.

Priority is claimed on Japanese Patent Application No. 2012-102724, filed Apr. 27, 2012, the content of which is incorporated herein by reference.

BACKGROUND ART

In recent years, in order to suppress global warming, reduction of carbon dioxide generated in various fields has been demanded. For example, in the automotive industry, a shift from conventional gasoline vehicles to electric vehicles and hybrid vehicles that are equipped with a secondary battery with less carbon dioxide emissions is expanding, and, in particular, development of lithium ion secondary battery that affects the mileage, safety and reliability has been attracting attention. In general, such a lithium ion secondary battery is configured from a non-aqueous electrolytic solution, a separator, an external packaging material, or the like, in addition to a cathode including a cathode active material layer formed on a cathode current collector and an anode including an anode active material layer formed on an anode current collector.

Conventionally, in the common lithium ion secondary batteries, a transition metal oxide containing lithium as a cathode active material has been used, and also the cathode active material has been formed on an aluminum foil serving as a cathode current collector. In addition, a carbon material such as graphite is used as the anode active material, and the anode active material is formed on a copper foil serving as an anode current collector. The cathode and anode are arranged via a separator in a non-aqueous electrolytic solution containing an organic solvent in which lithium salt electrolyte has been dissolved.

In the charging and discharging of the lithium ion secondary battery, lithium ions stored in the cathode active material are de-intercalated and released into the electrolytic solution during charging, and in the anode active material, a reaction is allowed to proceed due to the occlusion of lithium ions from the electrolytic solution between the crystal layers of the carbon material. In addition, a reaction opposite to that during charging is allowed to proceed at the time of discharging, and the reaction proceeds due to lithium ions being released from the anode active material and occluded in the cathode active material.

However, in a system using a carbon material such as graphite for an anode, when the discharge is close to 100%, the potential of the anode approaches 0 V, resulting in the deposition of dendrite. As a result, the lithium ions that are originally used in the electron transport are consumed, and it would further corrode and deteriorate the anode current collector. If such corrosion and deterioration progress, they may cause deterioration in the characteristics as the lithium ion secondary battery and failure. For this reason, in the system using a carbon material such as graphite for an anode, precise control of the charge and discharge voltage is required. In such systems, even when the potential difference between the cathode active material and the anode active material is large in theory, only a portion of lithium ions can be used, and there was a problem in terms of charge and discharge efficiency.

Accordingly, in recent years, research and development of the anode active material in which a high potential can be achieved have particularly been carried out actively. For example, since titanium dioxide has an electrical potential of about 1.5 V which is higher than the electrical potential of the conventional carbon material, it has been gaining attention as a material which does not cause the deposition of dendrite, and which is very safe and also capable of achieving high performance.

For example, in Patent Document 1, a secondary battery obtained by spray drying a slurry containing a hydrous titanium oxide and heating an organic binder for removal which uses titanium oxide with a void volume of the secondary particles of 0.005 to 1.0 $cm^3/g$ as an electrode active material has been described.

In addition, in recent years, it has been reported that titanium dioxide having a crystal structure of bronze type is also promising as an anode active material. For example, in Patent Document 2, a secondary battery using a bronze-type titanium dioxide having an isotropic shape of micron size for the electrode active material has been described.

In general, titanium dioxide has been used in a wide range of fields, including white pigments, dielectric materials and photocatalyst materials, and is widely circulated as a very inexpensive material. However, when titanium dioxide is used as it is as an anode active material of a lithium ion secondary battery, although the safety of the secondary battery can be improved, there is a problem in that the electrical capacitance is as small as about 160 mAh/g.

For example, although the secondary battery described in Patent Document 1 exhibits favorable cycle characteristics, since the electrical capacitance is as small as 160 mAh/g, it is necessary to use a large amount of anode active material in order to obtain a predetermined battery capacity. For this reason, there is a problem in that the weight and volume of the battery as a whole become large with the secondary battery described in Patent Document 1.

In addition, the secondary battery using a bronze-type titanium dioxide as the electrode active material like the one described in Patent Document 2 is facing a host of challenges for the practical use thereof, since the electrical capacitance is as small as 170 mAh/g and also the process is complex and requires a prolonged period of time.

CITATION LIST

Patent Documents

[Patent Document 1] International Patent Publication No. 2008/114667
[Patent Document 2] Japanese Unexamined Patent Application, First Publication No. 2008-117625

SUMMARY OF INVENTION

Technical Problem

The present invention has been made in view of the above problems, and has an object of providing a method for producing an anode active material for a secondary battery which exhibits a large electrical capacitance and excellent cycle characteristics; and an anode active material for a secondary battery. In addition, the present invention has an object of providing a method for producing an anode for a secondary battery which uses the above anode active material for a secondary battery; and an anode for a secondary battery. Furthermore, the present invention has an object of providing a secondary battery which exhibits excellent charge and discharge cycle characteristics and the like, and uses the above anode for a secondary battery.

Solution to Problem

The present invention includes the following configurations.

[1] A method for producing an anode active material for a secondary battery which is formed by coating a condensed phosphate containing an alkaline earth metal element on a surface of titanium dioxide, and contains 0.1 to 10% by mass of each of elemental phosphorus and the alkaline earth metal element, with respect to the titanium dioxide, the method including: a step of forming titanium dioxide by adding a titanium-containing compound to an acidic aqueous solution, to which phosphoric acid has been added, to carry out hydrolysis, and further adding a condensed phosphate and a compound containing an alkaline earth metal to the acidic aqueous solution, thereby coating a condensed phosphate containing an alkaline earth metal on the surface of the titanium dioxide.

[2] The method for producing an anode active material for a secondary battery according to the above [1], wherein a pH of the acidic aqueous solution at the time of the hydrolysis is in the range of 0.1 to 4.

[3] The method for producing an anode active material for a secondary battery according to the above [1] or [2], wherein a chloride is used as a compound containing the alkaline earth metal.

[4] The method for producing an anode active material for a secondary battery according to any one of the above [1] to [3], wherein a liquid temperature at the time of adding the condensed phosphate and the compound containing the alkaline earth metal into the acidic aqueous solution, and coating the condensed phosphate containing an alkaline earth metal on particle surfaces of the titanium dioxide is in the range of 30 to 70° C.

[5] An anode active material for a secondary battery, wherein a condensed phosphate containing an alkaline earth metal is present on a surface of titanium dioxide, and elemental phosphorus and the alkaline earth metal are each contained in an amount of 0.1 to 10% by mass, with respect to the titanium dioxide.

[6] The anode active material for a secondary battery according to the above [5], wherein the alkaline earth metal contained in the condensed phosphate is calcium or magnesium.

[7] The anode active material for a secondary battery according to the above [5] or [6], wherein a number average particle size of primary particles of the titanium dioxide is in a range of 0.001 to 0.1 μm.

[8] An anode for a secondary battery including a layer composed of an anode active material laminated on a metal foil, wherein the anode active material is the anode active material for a secondary battery according to any one of the above [5] to [7].

[9] The anode for a secondary battery according to the above [8], wherein the metal foil is an aluminum foil, and the anode active material is formed on one or both sides of the aluminum foil.

[10] The anode for a secondary battery according to the above [8] or [9], further including a binder.

[11] A method for producing an anode for a secondary battery including, in this order: a step of producing an anode active material for a secondary battery by the production method according to any one of the above [1] to [4]; and a step of adjusting a coating liquid by dispersing the anode active material for a secondary battery in a dispersion solvent, and applying and drying the coating liquid on one or both sides of a metal foil.

Advantageous Effects of Invention

According to the method for producing an anode active material for a secondary battery of the present invention, a method is adopted that includes, by adding a condensed phosphate and a compound containing an alkaline earth metal to an acidic aqueous solution obtained by dispersing titanium dioxide, a step of coating a condensed phosphate containing an alkaline earth metal on a surface of titanium dioxide so that the amount of elemental phosphorus and the amount of alkaline earth metal element on the surface are both to be in the range of 0.1 to 10% by mass with respect to the mass of titanium dioxide. As a result, it becomes possible to produce an anode active material for a secondary battery which is provided with a large electrical capacitance and excellent cycle characteristics.

In addition, according to the secondary battery anode active material according to the present invention, a configuration is adopted in which the secondary battery anode active material contains titanium dioxide, a condensed phosphate containing an alkaline earth metal is present on the surface of titanium dioxide, and the amount of elemental phosphorus and the amount of alkaline earth metal are both in the range of 0.1 to 10% by mass with respect to the mass of titanium dioxide. As described above, by optimally coating the particle surface of titanium dioxide with a condensed phosphate containing an alkaline earth metal, the occlusion properties of lithium ions for the charge transfer are improved, and also the occlusion and release of lithium ions are carried out smoothly. Therefore, an anode active material for a secondary battery which is provided with a large electrical capacitance and excellent cycle characteristics can be realized.

In addition, according to the anode for a secondary battery and the secondary battery of the present invention, since the secondary battery anode active material described above are used therein, the electrical capacitance is large and the cycle characteristics are also excellent.

DESCRIPTION OF EMBODIMENTS

Hereinafter, embodiments of the present invention: i.e., a method for producing an anode active material for a secondary battery, and an anode active material for a secondary battery; a method for producing an anode for a secondary battery using the anode active material for a secondary battery, and an anode for a secondary battery; and a secondary battery using the anode for a secondary battery, will be described with reference to the drawings as appropriate.

[Anode Active Material for Secondary Battery]

Figure 1:
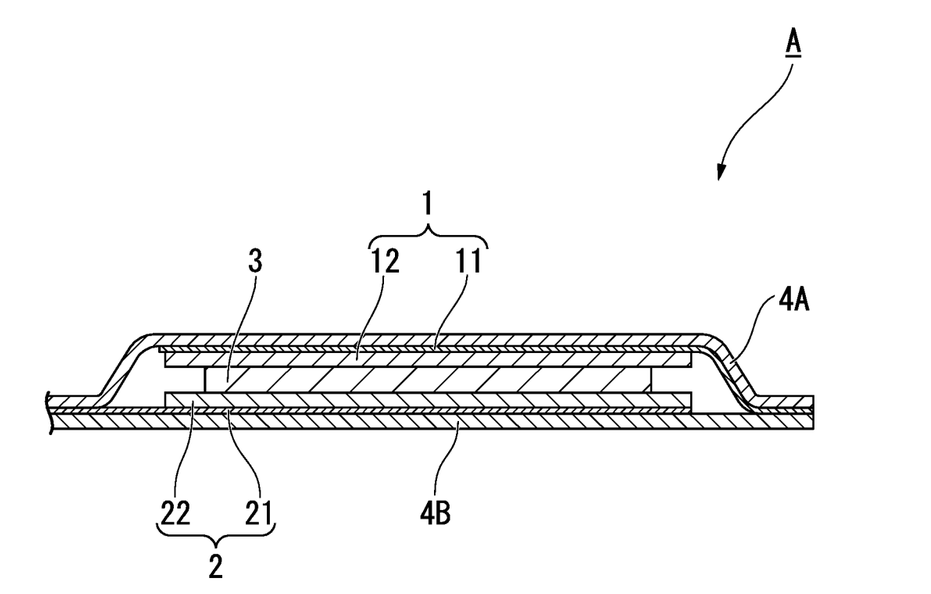
FIG. 1 is a cross-sectional diagram schematically showing an anode for a secondary battery according to an embodiment of the present invention.

A secondary battery anode active material 12 in the present invention contains titanium dioxide which is configured so that a condensed phosphate containing an alkaline earth metal is coated on the surface of the particles, and the amount of elemental phosphorus and the amount of alkaline earth metal are both in the range of 0.1 to 10% by mass with respect to the mass of titanium dioxide.

The shape of the primary particles of titanium dioxide is not particularly limited, and may be spherical, plate-like, polyhedral, acicular, rod-like, ring-like, amorphous, and the like. In addition, the number average particle size of the primary particles of titanium dioxide is preferably from 0.001 to 0.1 µm, and more preferably from 0.005 to 0.05 µm. When the average particle diameter of the primary particles of titanium dioxide is in the above-mentioned range, it is preferable from the viewpoints that activity at the surface of the particles is enhanced, the reactivity with the condensed phosphate containing an alkaline earth metal is improved, and a strong bond can be obtained. In addition, by ensuring that the average particle diameter of the primary particles of titanium dioxide is within the above range, the dispersibility is improved, and the productivity is also improved.

The number average particle size of the primary particles of titanium dioxide described in the present invention is obtained by measuring the primary particle sizes of 100 to 1,000 titanium dioxide particles by using an electron microscope and arithmetically averaging them. At this time, the sphere equivalent diameter is taken as the particle size if the primary particles are spherical, and the maximum diameter is taken as the particle size if the primary particles are plate-shaped, polyhedral, acicular, rod-shaped, circular, amorphous, and the like.

Further, as the crystal phase of titanium dioxide, an anatase type, rutile type, brookite type, bronze type, hollandite type, ramsdellite type, and the like are known, although it can be selected without any particular limitations in the present invention. Among these, a brookite type and bronze type are preferred from the viewpoint of high electrical capacitance, since the crystal density is relatively small and the lithium ions are easily occluded and stored within the crystal lattice. Further, in the present invention, as the crystal phase of titanium dioxide, a non-crystalline amorphous phase may be contained.

Analysis of the ratio of the crystal phase as described above can be carried out by using an X-ray diffractometer. In this case, first, a titanium dioxide powder is pulverized thoroughly with an agate mortar so that there are no aggregates. Subsequently, in order to identify the amorphous phase, to the resulting powder of titanium dioxide, a nickel oxide powder (99.9% reagent, for example, manufactured by Wako Pure Chemical Industries, Ltd.) as an internal standard is sufficiently mixed so as to be 10% by mass using an agate mortar. Then, the mixed powder is measured using an X-ray diffractometer (for example, PANalytical X'Pert (registered trademark) MRD device, manufactured by Spectris Co., Ltd.). The measurement at this time is carried out under the conditions of, for example, a tube voltage of 40 kV, a tube current of 20 mA, and a scan range 2θ of 10 to 80 degrees. Then, the Rietveld analysis is performed on the data obtained to identify the crystal phase. The Rietveld analysis can be performed using a commercially available software (for example, PANalytical X'Pert High Score Plus (registered trademark), manufactured by Spectris Co., Ltd.).

The condensed phosphate used in the anode for a secondary battery in the present invention is, for example, a salt of acid obtained by the dehydration condensation of orthophosphoric acid ($H_3PO_4$), and metaphosphates such as trimetaphosphates and tetrametaphosphates, polyphosphates such as pyrophosphates and tripolyphosphates, and ultraphosphates are preferred, and metaphosphates and pyrophosphates are more preferred. In addition, these condensed phosphates are coated so that the amount of elemental phosphorus with respect to the mass of titanium dioxide is preferably in the range of 0.1 to 10% by mass, more preferably in the range of 1 to 5% by mass, and even more preferably in the range of 1 to 2% by mass. If the amount of elemental phosphorus present on the surface of titanium dioxide is 0.1% by mass or more, it would be easy to sufficiently achieve the effect obtained by coating titanium dioxide, and if the amount is 10% by mass or less, it would be advantageous from an economic perspective.

The condensed phosphate being coated on the surface of titanium dioxide is determined by measuring the infrared absorption spectrum of the anode active material in a powder state.

The anode for a secondary battery of the present invention is characterized in that the condensed phosphate present on the particle surface of titanium dioxide contains at least an alkaline earth metal. Examples of such alkaline earth metals include beryllium, magnesium, calcium, strontium, barium and radium. Of these, the alkaline earth metal used in the present invention is not particularly limited, although it is preferable to use magnesium and calcium from the viewpoint that the effects obtained by coating the particle surface of titanium dioxide become more prominent. In addition, these alkaline earth metals are thought to have an effect of coupling the condensed phosphate ion with the titanium oxide surface, like a binder. For this reason, the content of these alkaline earth metals with respect to the mass of titanium dioxide is, in terms of metal elements, preferably in the range of 0.1 to 10% by mass, more preferably in the range of 0.3 to 5% by mass, and even more preferably in the range of 0.3 to 1.5% by mass. If the alkaline earth metal present on the surface of titanium dioxide is 0.1% by mass or more, it becomes difficult for the condensed phosphate to be released due to the binder effect, and if it is 10% by mass or less, the occlusion and release of lithium ions to titanium dioxide become easy.

In the secondary battery anode active material 12, titanium dioxide whose surface is coated with a condensed phosphate containing an alkaline earth metal is preferably contained in the range of 70 to 95% by mass, and more preferably contained in the range of 80 to 90% by mass, with respect to the total mass of the secondary battery anode active material 12.

[Method for Producing Anode Active Material for Secondary Battery]

Next, a method for producing the secondary battery anode active material 12 according to the present invention will be described.

A method for producing the secondary battery anode active material 12 which is a preferred aspect of the present embodiment is a method including a step of forming titanium dioxide by adding a titanium-containing compound to an acidic aqueous solution, to which phosphoric acid has been added, to carry out hydrolysis, and further adding a condensed phosphate and a compound containing an alkaline earth metal to the acidic aqueous solution, thereby coating a condensed phosphate containing an alkaline earth metal on the surface of titanium dioxide.

First, in the present embodiment, titanium dioxide is formed through hydrolysis by adding a titanium-containing compound to an acidic aqueous solution prepared by the addition of phosphoric acid. There is no particular limitation on the amount of phosphoric acid added at this time, and it may be usually from 0.02 to 2 g and preferably from 0.05 to 5 g, with respect to 1 kg of water in a slurry. Then, by further adding a condensed phosphate and a compound containing an alkaline earth metal into the acidic aqueous solution, a condensed phosphate containing an alkaline earth metal is coated on the surface of titanium dioxide to synthesize the secondary battery anode active material 12.

The method for forming titanium dioxide is not particularly limited, and it is possible to choose from any of the methods, for example, methods using different starting materials, such as a chlorine method that uses titanium chloride as the titanium-containing compound and purifies from the chloride, and a sulfuric acid method that purifies from titanium sulfate; and also methods with different reaction conditions, such as a gas phase method, a liquid phase method and a solid phase method. Among these, a method of hydrolyzing a titanium-containing compound in an acidic solution to obtain titanium dioxide is preferred. This is because when forming titanium dioxide in an acidic solution, since particles having a large specific surface area with very small primary particles are obtained, and also the activity of the particle surface is high, the reaction with the condensed phosphate containing an alkaline earth metal is satisfactory, which enables firm bonding therewith.

The pH of the acidic aqueous solution used in the production of titanium dioxide is preferably in the range of 0.1 to 4, and more preferably in the range of 0.5 to 3. If the pH of the acidic aqueous solution is 0.1 or more, since the rate of the hydrolysis reaction is increased and the primary particles would not become too large, titanium dioxide in which the activity of the particle surface is high and the reactivity with a condensed phosphate containing an alkaline earth metal is satisfactory can be obtained, and, moreover, the productivity is also improved. In addition, if the pH of the acidic aqueous solution is equal to or less than 4, there is no need to provide a crushing step and the like since the aggregation of the primary particles of titanium dioxide to be produced can be suppressed, and it becomes possible to suppress the production cost while ensuring high productivity.

The method of adjusting the pH and liquid temperature of the acidic aqueous solution is not particularly limited. For example, a method can be used in which an aqueous solution prepared by dissolving an acidic titanium-containing compound is mixed at room temperature in advance, while the pH is adjusted by the concentration of the acidic titanium-containing compound at that time, and the liquid temperature is then raised gradually to carry out the hydrolysis reaction within the temperature range described above. In addition, a method can also be used in which the hydrolysis reaction is carried out by adding dropwise an acidic aqueous solution of titanium-containing compound into water that is prepared in advance within the temperature range described above.

The liquid temperature at the time of hydrolysis is preferably in the range from 75° C. to the boiling point of the acidic aqueous solution, and more preferably in the range from 85° C. to the boiling point of the acidic aqueous solution. If the liquid temperature at the time of hydrolysis is at least 75° C., it is possible to maintain high productivity without causing significant reduction in the rate of hydrolysis. In addition, if the liquid temperature of the acidic aqueous solution at the time of hydrolysis is equal to or less than the boiling point thereof, it is also practical in terms of production cost since there is no requirement for a large-scale facility such as a pressurized vessel.

As other methods for producing titanium oxide, it is also possible to employ a gas phase method in which a solution of titanium-containing compound is sprayed and passed through the temperature zone exceeding 1,000° C. to obtain titanium dioxide particles by an oxidation reaction. The primary particles of titanium dioxide produced by such gas phase method in the high temperature range have a very small particle size, and the activity of the surface is also high. In addition, since it can be produced efficiently with less production steps, it is advantageous in terms of cost. Furthermore, similar to the liquid phase method described above, since titanium dioxide particles with high surface activity are obtained, the reactivity with the condensed phosphate containing an alkaline earth metal is improved.

In the present embodiment, as a method of making the condensed phosphate containing an alkaline earth metal to be present on the surface of titanium dioxide, for example, a method can be employed in which a predetermined amount of condensed phosphate is added and thoroughly dispersed in an acidic aqueous slurry containing titanium dioxide to which phosphoric acid has been added in advance, followed by the addition of a solution of compound of an alkaline earth metal and aging. As the aqueous slurry described above, for example, a reaction solution in which titanium dioxide has been produced by means of hydrolysis by adding a titanium-containing compound to the above acidic aqueous solution obtained by the addition of phosphoric acid may be used as it is. It is also possible to use those prepared by dispersing the titanium dioxide obtained by the gas phase method described above in an acidic aqueous solution to which phosphoric acid has been added in advance. The amount of condensed phosphate added at this time is usually from 0.05 to 20 kg and preferably from 0.3 to 5 kg, with respect to 1 kg of titanium dioxide in the slurry. When such a method is adopted, in order to accelerate and control the reaction, it is preferable to maintain a state where the reaction solution is heated at a constant temperature. The heating temperature of the reaction solution at this time is preferably in the range of 30 to 70° C., and more preferably in the range of 40 to 60° C. If the heating temperature is within this range, the balance between the dissolution of condensed phosphate and alkaline earth metal compound and the reaction thereof with the particle surface of titanium dioxide is improved, which enables uniform coating on the particle surface with no localization. In other words, since the solubilities of condensed phosphate and alkaline earth metal compound do not reduce if the heating temperature of the reaction solution is equal to or more than 30° C., it is possible to maintain a high reaction rate, which improves the productivity. In addition, since it is possible to suppress the reaction from occurring at sites other than the surface of titanium dioxide particles if the heating temperature of the reaction solution is equal to or less than 70° C., the coating efficiency to the surface of titanium dioxide particles can be enhanced.

Further, in the present embodiment, when the condensed phosphate containing an alkaline earth metal is coated on the particle surface of titanium dioxide, it is preferably aged at a constant heating temperature. During a period of such aging process, it is assumed that a portion of the condensed phosphate containing an alkaline earth metal is repeatedly adsorbed on or desorbed from the particle surface of titanium dioxide, thereby causing a reaction so as to coat in a state where the surface energy is stable. The aging time in this case is preferably in the range of 30 minutes to 10 hours, and more preferably from 1 to 5 hours. That is, if the aging time is 30 minutes or more, the coating state would be stabilized, and it is possible to prevent desorption during the filtration and washing. In addition, if the aging time is 10 hours or less, the coating state would be stabilized even further, while the production efficiency can be maintained.

In the present invention, upon forming titanium dioxide whose surface is coated with a condensed phosphate containing an alkaline earth metal, in particular, by first adding phosphoric acid to pure water, the dispersibility of the slurry to be adjusted can be improved. As a result, in a subsequent step, when an aging process is conducted by further adding a condensed phosphate and a compound containing an alkaline earth metal, efficiency of the condensation reaction of the phosphoric acid is increased, and the yield of the condensed phosphate containing an alkaline earth metal can be improved. Furthermore, the condensed phosphate containing an alkaline earth metal that is generated by the condensation is easily adsorbed onto the surface of the titanium dioxide particles, thereby achieving an effect of improving the coverage.

The compound containing an alkaline earth metal used in the present embodiment is not particularly limited, as long as it is soluble in the solution used in the present invention and can be ionized. Examples of such compounds include chlorides, bromides, iodides, nitrates and acetates, and among these, chlorides such as calcium chloride and magnesium chloride are preferably used since they are versatile and also exhibit high solubility.

In the present embodiment, by synthesizing the secondary battery anode active material 12 under the above conditions, it becomes possible to coat the surface of titanium dioxide coated with the condensed phosphate containing an alkaline earth metal, and to include 0.1 to 10% by mass of each of elemental phosphorus and an alkaline earth metal, with respect to the mass of titanium dioxide.

In addition, in the present embodiment, by filtering and washing the slurry obtained by the above procedure in which the secondary battery anode active material 12 is dispersed with a conventionally known method, followed by heating and drying, it is possible to obtain the secondary battery anode active material 12 in a powder form.

Moreover, in the present embodiment, it is also possible to further conduct annealing, under a predetermined atmosphere, temperature and time, on the secondary battery anode active material 12 after drying.

[Anode for Secondary Battery]

As illustrated in FIG. 1, a secondary battery anode 1 to be described in the present embodiment adopts a configuration in which a layer containing the secondary battery anode active material 12 described above is laminated on the surface of a metal foil 11. In addition, as in the example shown in FIG. 1, it is possible to configure a secondary battery A by interposing a separator 3 between the secondary battery anode 1 of the present embodiment and a cathode 2, which is formed by laminating a cathode active material 22 on a current collector 21, and sealing with external packaging materials 4A and 4B. Furthermore, in the secondary battery A, an electrolyte which is not shown and composed of a non-aqueous electrolytic solution and the like is sealed in a space secured by the external packaging materials 4A and 4B.

[Metal Foil]

There are no particular limitations on the material of the metal foil 21 used in the secondary battery anode 1 according to the present invention, and those used in a current collector of lithium ion secondary batteries can usually be employed. Further, as the metal foil 21, from the viewpoint that an inexpensive material with a stable oxide film on the surface and less variation in quality is required, it is preferable to use a foil of aluminum or an alloy thereof (in the following description, these are collectively referred to as an aluminum foil in some cases).

The material of aluminum foil (metal foil 21) is not particularly limited, and those known as a current collector of a secondary battery can be used, and it is preferable to use a pure aluminum foil or an aluminum alloy foil containing 95% by mass or more of aluminum. Here, examples of the pure aluminum foil include an A1085 material, and examples of the aluminum alloy foil include an A3003 material (Mn-added type).

The thickness of the aluminum foil is not particularly limited, although from the viewpoints of miniaturization of a secondary battery and the handling properties of aluminum foil, a current collector, an electrode and the like which are obtained using the foil, a thickness of 5 µm to 200 µm is usually preferred, and it is preferable to use one having a thickness of 5 µm to 100 µm when a roll-to-roll manufacturing method is performed.

In addition, as the shape of the aluminum foil, it may be a foil having no pores, or a foil having pores, such as a two-dimensional mesh foil, a three-dimensional mesh-type foil or a punching metal foil.

[Carbonaceous Material]

In laminating a layer containing the secondary battery anode active material 12 on the metal foil 11, it is more preferable if the layer is formed after further addition of a carbonaceous material as a conductive auxiliary agent, since the electrical conductivity of the layer containing the secondary battery anode active material layer 12 is improved. It is preferable that the carbonaceous material have a high electrical conductivity, since the carbonaceous material has a role of facilitating the exchange of electrons by being present in any one or more of the following sites: i.e., on the surface of the secondary battery anode active material, between the secondary battery anode active materials, or on the contact surface between the secondary battery anode active material and the metal foil. As such a carbonaceous material, conductive carbon black, graphite, nanocarbon, carbonaceous fibers and the like are preferred. Examples of the conductive carbon black include acetylene black, Ketjen black, furnace black and channel black, examples of the graphite include natural graphite and artificial graphite, and examples of the nanocarbon include carbon nanotubes and carbon nanofibers. One type of these carbonaceous materials can be used alone or two or more types thereof can be suitably used in combination.

The carbonaceous material may be spherical or amorphous particles or may be those having an anisotropic shape, such as a needle-like shape and a rod-like shape.

The particle size of the particulate carbonaceous material is not particularly limited, although those having a number average primary particle size of 10 nm to 5 µm are preferred, and those having a number average primary particle size of 10 nm to 1 µm are more preferred. Such a number average primary particle size can be obtained by measuring the primary particle sizes of 100 to 1,000 carbonaceous material particles by using an electron microscope and averaging them. At this time, the sphere equivalent diameter is taken as the particle size if the primary particles are spherical, and the maximum diameter is taken as the particle size if the primary particles are amorphous.

As the carbon nanotubes and carbon nanofibers described above, those usually having an average fiber diameter of 0.001 to 0.5 μm and preferably from 0.003 to 0.2 μm, and usually having an average fiber length of 1 to 100 μm and preferably from 1 to 30 μm are suitable from the viewpoint of improving electrical conductivity. The average fiber diameter and average fiber length of such carbonaceous materials can be obtained by observing the fiber diameters and fiber lengths of 100 to 1,000 conductive material fibers by using an electron microscope, and calculating an average value based on the number.

There are no particular limitations on the method to make the carbonaceous material being present selectively on the surface of the secondary battery anode active material. Examples thereof include processing methods in the gas phase, such as a coating method in the gas phase using a hydrocarbon-based gas as a source of carbonaceous material as described in Japanese Unexamined Patent Application, First Publication No. 2011-14368, and a chemical vapor deposition method as described in Japanese Patent No. 4393610. In addition, it is possible to select a solid phase method, such as a method in which the secondary battery anode active material, a binder and a carbonaceous material are dispersed in a suitable solvent in advance, and then, for example, mixed and dried in a ball mill or the like, thereby depositing onto the surface of the secondary battery anode active material; or a method in which the secondary battery anode active material and a carbonaceous material are mixed in powdery forms without using a binder, and subjected to a dry mechanochemical milling treatment in a planetary ball mill for carrying out direct coating. In this case, because it is preferable if there is a portion on the surface of the secondary battery anode active material which is not covered with the carbonaceous material, since lithium ions are easily occluded on and released from the secondary battery anode active material.

The mass of the carbonaceous material with respect to the secondary battery anode active material 12 is preferably from 1 to 15% by mass, and more preferably from 5 to 10% by mass. If the carbonaceous material is within this range, the carbonaceous material is sufficiently dispersed, and the carbonaceous material can be coated without being localized on the surface of the secondary battery anode active material. That is, if the mass of the carbonaceous material with respect to the secondary battery anode active material 12 as a whole is at least 1% by mass, the electrical conductivity is improved, and also by making the mass 15% by mass or less, it is possible to prevent the carbonaceous material from covering the surface of the secondary battery anode active material too much.

In addition, there are no particular limitations on the method to make the carbonaceous material being present between the secondary battery anode active materials, and a method of adding the carbonaceous material to the active material layer of a lithium ion secondary battery which has been generally carried out conventionally can be adopted. For example, a method in which the secondary battery anode active material, a binder and a carbonaceous material are dispersed in a suitable solvent, and then coated on the surface of a current collector represented by a metal foil, followed by drying can be selected. In this case, the amount of carbonaceous material in the entire secondary battery anode 1 except for the metal foil is preferably from 1 to 15% by mass, and more preferably from 5 to 10% by mass. That is, the electrical conductivity is improved by ensuring that the amount of carbonaceous material is at least 1% by mass. In addition, by ensuring that the amount is 15% by mass or less, since the mass ratio of the secondary battery anode active material can be sufficiently secured, the electrical capacitance per unit mass can be sufficiently obtained.

In addition, there are no particular limitations on the method to make the carbonaceous material being present on the contact surface between the secondary battery anode active material and the metal foil. For example, it is possible to select a method in which the carbonaceous material and a binder are dispersed in a suitable solvent in advance, and then coated on a metal foil, followed by drying, as described in Japanese Unexamined Patent Application, First Publication No. Hei 9-204937, Japanese Unexamined Patent Application, First Publication No. 2002-134103, Japanese Unexamined Patent Application, First Publication No. 2007-226969, Japanese Unexamined Patent Application, First Publication No. 2008-060060, Japanese Unexamined Patent Application, First Publication No. 2009-170132, Japanese Unexamined Patent Application, First Publication No. 2009-176540, Japanese Unexamined Patent Application, First Publication No. 2009-277660, Japanese Unexamined Patent Application, First Publication No. 2010-212167, International Publication No. WO 2009/147989 pamphlet, International Publication No. WO 2011/024797 pamphlet, International Publication No. WO 2011/024798 pamphlet, International Publication No. WO 2011/024799 pamphlet, International Publication No. WO 2012/029328 pamphlet, and the like, and other gas phase methods, such as a sputtering method, a vapor deposition method and a chemical vapor deposition method can also be used. In this case, since the electrical conductivity is improved by increasing the contact points between the secondary battery anode active material and the carbonaceous material, the coverage of the carbonaceous material on the metal foil is preferably in the range of 50 to 100%, and also the thickness thereof is preferably in the range of 0.1 to 5 μm. By ensuring that the thickness of the carbonaceous material on the metal foil is at least 0.1 μm, the carbonaceous material can be coated uniformly and thinly, and also by ensuring that the thickness is 5 μm or less, it becomes possible to suppress the resistance value, which is dependent on the film thickness. In other words, when the metal foil is covered with the carbonaceous material with a film thickness within the above-mentioned range, it is possible to reduce the contact resistance as the adhesion with the secondary battery anode active material is improved, and, as a result, it becomes possible to lower the internal resistance and the impedance of the secondary battery in which the secondary battery anode is used.

[Binder]

When the carbonaceous material described above is added to a layer composed of the secondary battery anode active material 12, or in the case of forming the secondary battery anode 1 by adhering the secondary battery anode active materials 12 with each other or the secondary battery anode active material 12 with the metal foil 11, a configuration including a binder may be adopted. There are no particular limitations on the binder in this case, and it is possible to use a known binder used for the electrodes of lithium ion secondary batteries. In addition, a polymer is generally used as such a binder, and examples of the polymer include acrylic polymers, vinyl polymers, fluorine-based polymers, polysaccharides and styrene-butadiene rubbers.

Examples of the acrylic polymers include those obtained by polymerizing an acrylic monomer, such as acrylic acid, methacrylic acid, itaconic acid, (meth)acryloyl morpholine, N,N-dimethyl(meth)acrylamide, N,N-dimethylaminoethyl (meth)acrylate and glycerol (meth)acrylate.

Examples of the vinyl polymers include those obtained by polymerizing a vinyl monomer, such as polyvinyl acetals, ethylene-vinyl alcohol copolymers, polyvinyl alcohols, poly(N-vinylformamide) and poly(N-vinyl-2-pyrrolidone).

Examples of the fluorine-based polymers include polytetrafluoroethylene (PTFE) and polyvinylidene fluoride (PVdF).

Examples of the polysaccharides include those obtained by the polycondensation of monosaccharides, such as chitin, chitosan, cellulose, starch, and the derivatives thereof. In the case of using a polysaccharide, an organic acid may be added, and it is preferable since the cross-linking properties are improved and the adhesiveness and solvent resistance are enhanced when an organic acid is added.

When using a binder as described above, if it is configured such that the binder is preferably contained in the range of 1 to 15% by mass, and more preferably from 5 to 10% by mass, in the secondary battery anode active material 12, detachment and cracking do not occur, and the secondary battery anode 1 in which the electrical conductivity is ensured can be obtained.

[Additive]

The layer composed of the secondary battery anode active material 12 may contain a known additive that is used in the anode active material layer of a lithium ion secondary battery, such as a thickener, in addition to the secondary battery anode active material, the carbonaceous material and the binder described above, and examples thereof include carboxymethyl cellulose.

For example, the secondary battery anode 1 can be obtained by dispersing the secondary battery anode active material 12 described above in a dispersion solution to prepare a coating liquid, and applying the coating liquid on one or both sides of the metal foil 11, followed by drying. The method of forming the layer containing the secondary battery anode active material 12 on the metal foil 11 is not particularly limited, and a known method which is used in the production of secondary batteries can be employed. Examples thereof include a coating method described below in detail.

As a coating method, for example, it is possible to select from among bar coating, gravure coating, gravure reverse coating, roll coating, Meyer bar coating, blade coating, knife coating, air knife coating, comma coating, slot die coating, die coating, dip coating, and the like. In particular, when forming a thick layer containing a secondary battery anode active material, from the viewpoint of easy control of the thickness of the coating film, it is preferable to select a die coating method.

When forming a layer containing a secondary battery anode active material by a coating method, a coating liquid obtained by dispersing the secondary battery anode active material, and, if necessary, a carbonaceous material and a binder, in a solvent is used. The solvent used herein is not particularly limited, and, for example, it is possible to use an aprotic polar solvent, such as N-methyl-2-pyrrolidone and γ-butyrolactone. In addition, in order to improve the wettability of the secondary battery anode active material 12 with the metal foil 11, for example, a protic polar solvent such as isopropyl alcohol and n-propyl acetate may be added.

The composition of the coating liquid described above is not particularly limited, and the coating can be carried out as long as it is in a slurry or paste form, and it is possible to adjust the composition and viscosity of the coating liquid in accordance with the characteristics of the coating method and coating machine. In addition, when producing a coating liquid, in order to disperse the materials uniformly, it is necessary to perform stirring and mixing thoroughly. The methods for stirring and mixing at this time are not particularly limited either, and a method using, for example, a ball mill, a sand mill, a pigment dispersing machine, a grinder, an ultrasonic dispersing machine, a homogenizer, a planetary mixer, a Hobart mixer or the like can be mentioned. In addition, the use of a high-speed stirrer, such as that described in Japanese Patent No. 3,256,801, is preferred because a uniform coating liquid can be produced.

Then, a layer composed of the secondary battery anode active material 12 is formed by applying the coating liquid described above which contains a component of a secondary battery anode active material on the metal foil 11, followed by drying. In the case of forming a layer containing the secondary battery anode active material 12 on both sides of the metal foil 11, each side may be subjected to a coating operation one by one, or a coating operation may be conducted simultaneously on both sides. In addition, it is also possible to perform a pressing process after coating to increase the electrode density.

[Secondary Battery]

As illustrated in FIG. 1, the secondary battery A according to the present invention includes the secondary battery anode 1 as described above. Typically, a secondary battery is configured by: including a cathode, a separator 3 and an electrolyte, in addition to an anode; sandwiching a separator 3 and a non-aqueous electrolytic solution which is not shown in the drawing with a cathode 2 formed by laminating a cathode active material 22 on a current collector 21; and being sealed with external packaging materials 4A and 4B, as in the illustrated example.

[Cathode]

The cathode 2 is not particularly limited, as long as it can be used in the secondary battery in general. In many cases, the cathode 2 includes a cathode active material 22, a current collector 21, and a binder not shown in the drawing.

As the cathode active material 22, for example, lithium cobaltate ($LiCoO_2$), lithium manganate ($LiMn_2O_4$), lithium nickelate ($LiNiO_2$), ternary lithium compounds of Co, Mn and Ni ($Li(Co_xMn_yNi_z)O_2$), sulfur-type ($TiS_2$) and olivine-type ($LiFePO_4$, $LiMnPO_4$) materials, and the like can be used.

In addition, as a conductive auxiliary agent included in the cathode active material 22, for example, carbon black, such as acetylene black, Ketjen black and furnace black, artificial and natural graphite, carbon fibers, vapor-grown carbon fibers, carbon nanotubes, carbon nanofibers, and the like can be used.

Further, as a binder, for example, polyvinylidene fluoride can be used. In addition, as the current collector 21 on which surface a layer containing the cathode active material 22 is formed, similar to the metal foil 11 on which a layer containing the secondary battery anode active material 12 described above is formed, typically, it is possible to use those used in a current collector of lithium ion secondary batteries. That is, as the current collector 21, an inexpensive material with a stable oxide film on the surface and less variation in quality is required, and, for example, it is preferable to use a stainless steel mesh or an aluminum foil.

[Separator]

As a separator, those known to be used in the secondary batteries can be used. Examples thereof include microporous films of porous polyethylene or polypropylene. A heat resistant layer containing inorganic particles may be formed on the surface of the separator. In those cases where a solid electrolyte and polymer electrolyte to be described later are used as the electrolyte, the separator may be omitted at times.

[Electrolyte]

There are cases where the electrolyte is present as a polymer electrolyte, in addition to the cases where it is present as a non-aqueous electrolytic solution or present as a solid electrolyte, in a secondary battery. Known materials which are used in the lithium ion secondary batteries can be used for any of these electrolytes.

The non-aqueous electrolytic solution contains an electrolyte in a non-aqueous solvent. Examples of the non-aqueous solvents include cyclic carbonates such as propylene carbonate (PC) and ethylene carbonate (EC), chain-like carbonates such as dimethyl carbonate (DMC), ethyl methyl carbonate (EMC) and diethyl carbonate (DEC), and other fatty acid esters, and these are used either alone or by mixing two or more types at an arbitrary ratio. In addition, as the electrolyte, for example, a fluorine-containing lithium salt such as lithium hexafluorophosphate ($LiPF_6$) and lithium tetrafluoroborate ($LiBF_4$) can be mentioned.

Examples of the solid electrolytes (inorganic solid electrolytes) include those containing sulfide-based glass as a major component. More specifically, for example, glass ceramics containing, in addition to lithium sulfide, a combination of one or more components from the group consisting of silicon sulfide, germanium sulfide, phosphorus sulfide and boron sulfide can be mentioned. Among these, a combination of lithium sulfide and phosphorus sulfide is preferred from the viewpoint of high conductivity. Further, the composition ratio of these components is not particularly limited.

In addition, those obtained by subjecting these materials to a heat treatment to increase the degree of crystallinity are particularly preferred from the viewpoint of high electrical conductivity.

Furthermore, when using a solid electrolyte, lithium salts such as lithium silicate, lithium germanate, lithium phosphate and lithium borate, a simple substance of phosphorus and a simple substance of sulfur, and a halogen and a halogen compound may be included as other components.

In addition, in the case of using a polymer electrolyte instead of the non-aqueous electrolyte and solid electrolyte described above, those obtained by including the electrolyte salt described above in polyethylene oxide derivatives and polymers containing the derivatives, polypropylene oxide derivatives and polymers containing the derivatives, phosphoric acid ester polymers, polycarbonate derivatives and polymers containing the derivatives, or the like, can be mentioned.

[External Packaging Material]

As the external packaging materials 4A and 4B, it is possible to select a known external packaging material used in the secondary batteries, and examples thereof include a laminated packaging material and metal cans. Among these, from the viewpoints of size increase and weight reduction of the secondary battery, a laminated packaging material with a light unit weight is preferred. The configuration of such laminated packaging materials is not particularly limited, although examples thereof include those having a polymer layer (resin) on both sides of the metal foil.

Of the polymer layers, an outer layer which is to become the outer side of the secondary battery is usually selected considering the viewpoints of heat resistance, puncture strength, lubricity, printability, and the like, and more specifically, for example, polyamides and those obtained by laminating a polyester on a polyamide can be used. Examples of the polyesters to be used here include polyethylene terephthalate, polyethylene naphthalate and polybutylene terephthalate. In addition, in the battery producing step, considering the risk of adhesion of the electrolytic solution to the polyamide in the outer layer, a coating layer for improving the resistance to the electrolytic solution is provided on the surface of the polyamide layer in some cases. For such a coating layer, at least one type of polymer selected from fluorine-containing polymers, acrylic polymers, polyurethanes, polyesters and polysilicones is used.

Of the polymer layers, an inner layer which is to become the inner side of the secondary battery is not particularly limited as long as it is a material that can be melted by heating to seal the secondary battery in a bag-like manner, and it is preferably a layer mainly composed of polyolefin, and more preferably a layer mainly composed of polypropylene. In addition, the inner layer may be those formed by laminating a plurality of layers, and, for example, those having an acid-modified polypropylene layer on the metal foil side and also having a polypropylene sheet thereon can be mentioned. Further, as an inner layer, it is also possible to use those obtained by laminating a random polypropylene and a block polypropylene. In addition, it is preferable if the inner layer has a thickness of 20 to 150 μm since the sealing property by heating is improved.

As the metal foil used for the external packaging materials 4A and 4B, an aluminum foil, a stainless steel foil, a nickel foil, and the like can be mentioned, although an aluminum foil is particularly preferable since it is lightweight and cheap. The material of the aluminum foil is not particularly limited, but a soft foil is preferred when considering the workability, and in general, an aluminum-iron based alloy foil such as A8021 and A8079 is selected when further taking the strength into consideration. In addition, the thickness of the external packaging materials 4A and 4B is preferably in the range of 20 to 100 μm, in consideration of the moisture barrier properties, strength, and workability.

The laminated packaging material used for the external packaging materials 4A and 4B may have, in addition to those described above, other layers, such as an adhesive layer, between the outer layer and the metal foil and between the inner layer and the metal foil.

[Application of Secondary Battery]

The secondary battery according to the present invention can be applied to a power supply system. In addition, the power supply system can be applied to, for example, automobiles; transportation machines such as trains, ships and aircrafts; mobile devices such as mobile phones, personal digital assistants and portable electronic computers; office equipment; power generation systems, such as photovoltaic power generation systems, wind power generation systems and fuel cell systems; and the like.

As described above, according to the method for producing the secondary battery anode active material 12 which is a preferred aspect of the present embodiment, a method is adopted that includes, by first adding a condensed phosphate and a compound containing an alkaline earth metal to an acidic aqueous solution obtained by dispersing titanium dioxide, a step of coating a condensed phosphate containing an alkaline earth metal on a surface of titanium dioxide so that elemental phosphorus and alkaline earth metal element are each contained on the surface in the range of 0.1 to 10% by mass with respect to the mass of titanium dioxide. As a result, it becomes possible to produce the secondary battery anode active material 12 which is provided with a large electrical capacitance and excellent cycle characteristics.

In addition, in the above method, in those cases where the compound containing the alkaline earth metal and phosphoric acid are added in an acidic aqueous solution, and the liquid temperature at the time of coating the condensed phosphate containing an alkaline earth metal on the particle surface of titanium dioxide is set within the range of 30 to 70° C., since the balance between the dissolution of condensed phosphate and alkaline earth metal compound and the reaction thereof with the particle surface of titanium dioxide is improved, the condensed phosphate containing an alkaline earth metal can be uniformly coated with no localization on the particle surface of titanium dioxide. As a result, the effect of obtaining a large electrical capacitance and excellent cycle characteristics as described above becomes more prominent.

In addition, according to the secondary battery anode active material 12 of the present invention, a configuration is adopted in which the secondary battery anode active material 12 contains titanium dioxide, a condensed phosphate containing an alkaline earth metal is present on the surface of titanium dioxide, and the amount of elemental phosphorus and the amount of alkaline earth metal are both in the range of 0.1 to 10% by mass with respect to the mass of titanium dioxide. As described above, by optimally coating the particle surface of titanium dioxide with a condensed phosphate containing an alkaline earth metal, the occlusion properties of lithium ions for the charge transfer are improved, and also the occlusion and release of lithium ions are carried out smoothly. Therefore, the secondary battery anode 1 provided with a large electrical capacitance and excellent cycle characteristics can be realized.

In addition, according to the secondary battery A of the present invention, since the secondary battery anode 1 described above is used therein, the electrical capacitance is large and the cycle characteristics are also excellent.

EXAMPLES

Next, the present invention will be described in more detail, based on a series of Examples and Comparative Examples. The scope of the present invention is not limited by the present Examples, and it is possible to make suitable changes to the method for manufacturing an anode for a secondary battery, the anode for a secondary battery and the secondary battery according to the present invention within the scope that does not depart from the spirit of the present invention.

Example 1

Synthesis of Anode Active Material for Secondary Battery

In Example 1, an anode active material for a secondary battery was synthesized by the following procedure.

First, 10 g of phosphoric acid (reagent grade) was added with stirring to 47 liters of pure water which was weighed in advance, and the resulting slurry (acidic aqueous solution) was further heated with stirring to hold the temperature at 98° C. Then, 7 kg of an aqueous titanium tetrachloride solution (manufactured by OSAKA Titanium Technologies Co., Ltd.) with a titanium concentration of 15% by mass was added dropwise to the resulting slurry for 120 minutes, and the temperature was further raised to 100° C. and was held for 90 minutes. At this time, cloudiness was observed from immediately after the dropwise addition of the aqueous solution of titanium tetrachloride. In addition, the pH of the slurry obtained here was 0.5. Furthermore, the resultant slurry in the form of a cloudy suspension was passed through an electrodialysis machine to remove chlorine, and the pH was set to 5. Then, when an aliquot of the slurry was sampled and measured for its solid content concentration by a dry constant mass method, it was found to be 2% by mass.

Next, the secondary battery anode active material which was dried and was in the form of a powder was analyzed using an X-ray diffractometer (PANalytical X'Pert (registered trademark) MRD measurement device, manufactured by Spectris Co., Ltd.), and, as a result, it was confirmed to be titanium dioxide that included an anatase-type crystal form. The X-ray diffraction measurement was carried out under the conditions of a tube voltage of 40 kV, a tube current of 20 mA, and a scan range 20 of 10 to 80°. In addition, the diffraction patterns obtained were analyzed using the JCPDS card of titanium dioxide and were identified including the crystalline form.

Next, 1 kg of metaphosphate soda (manufactured by Taihei Chemical Industrial Co., Ltd.) was added to the obtained slurry of titanium dioxide, and the resultant was sufficiently stirred until being dispersed (condensed phosphate).

In addition, 200 g of calcium chloride (manufactured by Tokuyama Corporation) was added to 2,000 liters of pure water which was weighed in advance, thereby producing a calcium chloride solution (compound containing an alkaline earth metal).

Then, the titanium dioxide slurry containing sodium metaphosphate and the calcium chloride solution were mixed, and the resulting mixture was kept for 4 hours at 40° C. The electrical conductivity at that time was 10,000 µS/cm.

Next, the resulting slurry was subjected to filtration and washing using a rotary filter press (manufactured by Kotobuki Giken Co., Ltd.) and was washed thoroughly until the electrical conductivity of the filtrate reached 50 µS/cm. The pH of the slurry at this time was 8.5. In addition, when an aliquot of the slurry was sampled and measured for its solid content concentration, it was found to be 10% by mass. Next, the filtration residue of the rotary filter press was dried for 3 hours at 120° C. to obtain a dry powder of a secondary battery anode active material. Then, as a result of the analysis of the thus obtained dry powder of the secondary battery anode active material using FT-IR (FT-IR 1650 type, manufactured by PerkinElmer, Inc.), the absorption of metaphosphoric acid was confirmed.

Next, when the dry powder of the secondary battery anode active material was dissolved completely by a microwave acid dissolution method and analyzed using an ICP (ICPS-100V, manufactured by Shimadzu Corporation), it was confirmed that 0.5% by mass of calcium and 1.2% by mass of phosphorus were present. At this time, the measurements were conducted using the measurement wavelengths of 393.37 nm and 177.50 nm for calcium and phosphorus, respectively.

Furthermore, the dry powder of the secondary battery anode active material was photographed with a scanning electron microscope (JSM-7500F, manufactured by JEOL Co., Ltd.), and the average particle diameter was determined by measuring the particle diameter of 300 primary particles and averaging by the number of particles, which was 0.015 m.

[Production of Anode for Secondary Battery]

Then, in the present Example, 82 parts by mass of the secondary battery anode active material described above, 6 parts by mass of acetylene black (product name: Denka Black HS-100 (registered trademark), manufactured by Denki Kagaku Kogyo Kabushiki Kaisha) as a conductive auxiliary agent, 12 parts by mass of polyvinylidene fluoride (product name: KF Polymer #9210 (registered trademark), manufactured by Kureha Corporation) as a binder and N-methyl-2-pyrrolidone (industrial grade) as a dispersing solvent were each mixed so as to achieve adequate fluidity, thereby producing a slurry (coating solution) for the anode.

Next, as an anode current collector (metal foil), an aluminum foil of 20 μm in thickness made from A1085 material which was subjected to alkali cleaning was prepared. Then, on one side of the aluminum foil, the anode slurry described above was coated using the doctor blade method (clearance 250 μm), and thereafter, by carrying out preliminary drying at 100° C. in the atmosphere for 1 hour, followed by 1 hour of vacuum drying at 120° C., an anode for a secondary battery was obtained. The thickness of the electrode layer of the resulting anode for a secondary battery was 55 μm, the coating amount was 4.5 mg/cm$^2$, and the electrode density was 1.3 g/cm$^3$.

[Production of Battery Cell]

Next, in the present Example, in order to perform the battery cell evaluation of the resulting anode for a secondary battery, a three electrode type cell was produced.

First, the anode for a secondary battery obtained by the procedure described above was cut out into a diameter of 16 mm (area of 2.01 cm$^2$), and was set on a working electrode. In addition, lithium metal foils (manufactured by Honjo Metal Co., Ltd.) having a thickness of 0.4 mm were set on a reference electrode and counter electrode, and a LiPF$_6$ solution (manufactured by Kishida Chemical Co., Ltd.) used as an electrolytic solution, which contained 1M of LiPF$_6$ as an electrolyte and a solvent (ethylene carbonate (EC): methyl ethyl carbonate (MEC)=2:3 (vol %)) was injected into the cell so that the electrodes were fully immersed. Between the working electrode and the counter electrode, a separator (product name: Celgard #2400 (registered trademark), manufactured by Polypore International, Inc.) having a thickness of 25 μm was arranged so as to separate the electrodes.

By following the procedure described above, the battery cell of Example 1 was produced. The assembly of the battery cell was carried out in a glove box in an argon atmosphere.

[Characteristic Evaluation of Battery Cell]

For the battery cell obtained by the procedure described above, the following characteristic evaluation was conducted.

(Evaluation of Electrical Capacitance)

For the electrical capacitance of the battery cell, the evaluation was conducted in a room temperature atmosphere. At this time, after charging at a constant current and constant voltage (0.15 mA/cm$^2$, 1.0 V, 12 μA cut), the discharge capacity when discharged up to 3.0 V at a constant current (0.15 mA/cm$^2$) was taken as the electrical capacitance (mAh/g (anode active material)).

(Evaluation of Cycle Characteristics)

A cycle test of the battery cell was performed under an atmosphere at room temperature to evaluate the change in capacity. At this time, for each battery cell, the charge and discharge current was set to 0.15 mA/cm$^2$, and after charging to 1.0 V at a constant current, it was discharged to 3.0 V at the same current density, and the charge and discharge cycle was repeated 100 times. In addition, the ratio of the discharge capacity at the 2nd cycle and the 100th cycle ((discharge capacity at the 100th cycle)/(discharge capacity at the 2nd cycle))×100 was defined as a capacity retention rate (%), and was used as an index of cycle characteristics.

The following Table 1 shows the production conditions in the present Example, as well as a list of the evaluation results for the primary particle size of the titanium oxide contained in the synthesized secondary battery anode active material, the presence or absence of phosphate absorption by the titanium dioxide particles by FT-IR, and the like (those of Examples 2 to 5 and Comparative Examples 1 to 3 are also shown).

In addition, the following Table 2 shows a list of the evaluation results for the properties of the battery cell produced in the present Example (those of Examples 2 to 5 and Comparative Examples 1 to 3 are also shown).

TABLE 1

Production conditions of secondary battery anode active material

| | Formation of titanium dioxide | | | Coating of condensed phosphate containing alkaline earth metal | | | | |
|---|---|---|---|---|---|---|---|---|
| | Acidic aqueous solution | | | Addition of phosphoric acid before titanium dioxide formation | Compound containing Condensed phosphate | alkaline earth metal | Aging conditions | |
| | Liquid temperature (° C.) | pH (—) | Titanium-containing compound | | | | Temperature (° C.) | Time (min) |
| Ex. 1 | 98 | 0.5 | Aqueous titanium tetrachloride solution | Added | Metaphosphoric acid | Calcium | 40 | 240 |
| Ex. 2 | 98 | 0.5 | Aqueous titanium tetrachloride solution | Added | Metaphosphoric acid | Calcium | 40 | 240 |
| Ex. 3 | 98 | 0.5 | Aqueous titanium tetrachloride solution | Added | Metaphosphoric acid | Calcium | 40 | 240 |
| Ex. 4 | 98 | 0.5 | Aqueous titanium tetrachloride solution | Added | Metaphosphoric acid | Calcium | 40 | 240 |
| Ex. 5 | 98 | 0.5 | Aqueous titanium tetrachloride solution | Added | Metaphosphoric acid | Magnesium | 40 | 240 |
| Comp. Ex. 1 | 98 | 0.5 | Aqueous titanium tetrachloride solution | Not added | Metaphosphoric acid | Calcium | 40 | 240 |
| Comp. Ex. 2 | Titanium dioxide powder (F-4, manufactured by Showa Denko K.K.) | | | | | | | |
| Comp. Ex. 3 | Titanium dioxide powder (F-4S05, manufactured by Showa Denko K.K.) | | | | | | | |

TABLE 2

| | Anode active material for secondary battery | | | | | Secondary battery properties | | |
| | Primary particle size | Coating | | Mass ratio with respect to titanium dioxide | | After 100 cycles | | |
| | of titanium dioxide (μm) | Type | FT-IR spectrum (absorption of condensed phosphate) | Elemental phosphorus (mass %) | Alkali metal (mass %) | Electrical capacitance (mAh/g) | Capacity retention rate (%) | Note |
|---|---|---|---|---|---|---|---|---|
| Ex. 1 | 0.015 | Condensed phosphate containing calcium | Absorption of metaphosphoric acid | 1.2 | 0.5 | 217 | 85 | |
| Ex. 2 | 0.015 | Condensed phosphate containing calcium | Absorption of metaphosphoric acid | 1.7 | 1 | 234 | 88 | |
| Ex. 3 | 0.015 | Condensed phosphate containing calcium | Absorption of metaphosphoric acid | 1.5 | 0.5 | 215 | 82 | |
| Ex. 4 | 0.015 | Condensed phosphate containing calcium | Absorption of metaphosphoric acid | 1.2 | 0.5 | 222 | 82 | |
| Ex. 5 | 0.015 | Condensed phosphate containing calcium | Absorption of metaphosphoric acid | 1.2 | 0.75 | 218 | 82 | |
| Comp. Ex. 1 | 0.12 | None | Absorption of metaphosphoric acid | 0.03 | 0.06 | 181 | 63 | |
| Comp. Ex. 2 | 0.031 | None | No absorption | Below detection limit | Below detection limit | 177 | 30 | |
| Comp. Ex. 3 | 0.032 | SiO$_2$ | No absorption | Below detection limit | Below detection limit | — | — | Occurrence of electrode detachment |

As shown in Table 1, in Example 1, an absorption spectrum of metaphosphoric acid was confirmed in the secondary battery anode active material by the FT-IR measurement, and it was also confirmed by ICP to include 1.2% by mass of elemental phosphorus and 0.5% by mass of calcium. In addition, as shown in Table 2, it became clear that the battery cell produced by using the secondary battery anode active material of Example 1 had an electrical capacitance of 217 (mAh/g (anode active material)) and that a large electrical capacitance was secured. Furthermore, in Example 1, the capacity retention rate after 100 cycles was 85%, which revealed that it was provided with excellent cycle characteristics.

Example 2

In Example 2, an anode active material for a secondary battery was formed to produce an anode for a secondary battery in the same manner as in Example 1 described above, with the exception that after producing a slurry containing titanium dioxide by the same procedure as in Example 1 described above, the amounts of the sodium metaphosphate (condensed phosphate) and calcium chloride (compound containing an alkaline earth metal) added to the titanium dioxide slurry were changed to 3 kg and 600 g, respectively. Then, by using the anode for a secondary battery, a battery cell was produced in the same manner as in Example 1.

Also in Example 2, as a result of the analysis of the crystal phase of titanium dioxide in the same manner as in Example 1 by conducting X-ray diffraction on the secondary battery anode active material which was dried and was in the form of a powder, it was confirmed to be titanium dioxide that included an anatase-type crystal form.

In addition, as a result of the FT-IR analysis of the dry powder of the secondary battery anode active material which was obtained, in the same method as in Example 1, by drying the filtration residue at a high temperature after subjecting the slurry to filtration and washing with a rotary filter press, the absorption of metaphosphoric acid was confirmed. In addition, when the dry powder of the secondary battery anode active material was dissolved and analyzed by ICP in the same manner as described above, it was confirmed that 1.7% by mass of phosphorus and 1.0% by mass of calcium were present.

Furthermore, when the dry powder of the secondary battery anode active material was photographed with a scanning electron microscope and the average particle diameter of primary particles was determined in the same manner as described above, it was 0.015 μm.

In addition, as shown in Table 2, it became clear that the battery cell produced by using the secondary battery anode active material of Example 2 had an electrical capacitance of 234 (mAh/g (anode active material)) and that a large electrical capacitance was secured. Furthermore, in Example 2, the capacity retention rate after 100 cycles was 88%, which revealed that it was provided with excellent cycle characteristics.

Example 3

In Example 3, an anode active material for a secondary battery was formed to produce an anode for a secondary battery in the same manner as in Example 1 described above, with the exception that after producing a slurry containing titanium dioxide by the same procedure as in Example 1 described above, the sodium metaphosphate (condensed phosphate) added to the titanium dioxide slurry was changed to 2.3 kg of sodium polyphosphate. Then, by using the anode for a secondary battery, a battery cell was produced in the same manner as in Example 1.

Also in Example 3, as a result of the analysis of the crystal phase of titanium dioxide in the same manner as in Example 1 by conducting X-ray diffraction on the secondary battery anode active material which was dried and was in the form of a powder, it was confirmed to be titanium dioxide that included an anatase-type crystal form.

In addition, as a result of the FT-IR analysis of the dry powder of the secondary battery anode active material which was obtained, in the same method as in Example 1, by drying the filtration residue at a high temperature after subjecting the slurry to filtration and washing with a rotary filter press, the absorption of polyphosphoric acid was confirmed. In addition, when the dry powder of the secondary battery anode active material was dissolved and analyzed by ICP in the same manner as described above, it was confirmed that 1.5% by mass of phosphorus and 0.5% by mass of calcium were present.

Furthermore, when the dry powder of the secondary battery anode active material was photographed with a scanning electron microscope and the average particle diameter of primary particles was determined in the same manner as described above, it was 0.015 μm.

In addition, as shown in Table 2, it became clear that the battery cell produced by using the secondary battery anode active material of Example 3 had an electrical capacitance of 215 (mAh/g (anode active material)) and that a large electrical capacitance was secured. Furthermore, in Example 3, the capacity retention rate after 100 cycles was 82%, which revealed that it was provided with excellent cycle characteristics.

Example 4

In Example 4, an anode active material for a secondary battery was formed to produce an anode for a secondary battery in the same manner as in Example 1 described above, with the exception that after producing a slurry containing titanium dioxide by the same procedure as in Example 1 described above, the sodium metaphosphate (condensed phosphate) added to the titanium dioxide slurry was changed to 1.3 kg of sodium pyrophosphate. Then, by using the anode for a secondary battery, a battery cell was produced in the same manner as in Example 1.

Also in Example 4, as a result of the analysis of the crystal phase of titanium dioxide in the same manner as in Example 1 by conducting X-ray diffraction on the secondary battery anode active material which was dried and was in the form of a powder, it was confirmed to be titanium dioxide that included an anatase-type crystal form.

In addition, as a result of the FT-IR analysis of the dry powder of the secondary battery anode active material which was obtained, in the same method as in Example 1, by drying the filtration residue at a high temperature after subjecting the slurry to filtration and washing with a rotary filter press, the absorption of pyrophosphoric acid was confirmed. In addition, when the dry powder of the secondary battery anode active material was dissolved and analyzed by ICP in the same manner as described above, it was confirmed that 1.2% by mass of phosphorus and 0.5% by mass of calcium were present.

Furthermore, when the dry powder of the secondary battery anode active material was photographed with a scanning electron microscope and the average particle diameter of primary particles was determined in the same manner as described above, it was 0.015 μm.

In addition, as shown in Table 2, it became clear that the battery cell produced by using the secondary battery anode active material of Example 4 had an electrical capacitance of 222 (mAh/g (anode active material)) and that a large electrical capacitance was secured. Furthermore, in Example 4, the capacity retention rate after 100 cycles was 82%, which revealed that it was provided with excellent cycle characteristics.

Example 5

In Example 5, an anode active material for a secondary battery was formed to produce an anode for a secondary battery in the same manner as in Example 1 described above, with the exception that after producing a slurry containing titanium dioxide by the same procedure as in Example 1 described above, the calcium chloride (compound containing an alkaline earth metal) added to the titanium dioxide slurry was changed to 300 g of magnesium chloride. Then, by using the anode for a secondary battery, a battery cell was produced in the same manner as in Example 1.

Also in Example 5, as a result of the analysis of the crystal phase of titanium dioxide in the same manner as in Example 1 by conducting X-ray diffraction on the secondary battery anode active material which was dried and was in the form of a powder, it was confirmed to be titanium dioxide that included an anatase-type crystal form.

In addition, as a result of the FT-IR analysis of the dry powder of the secondary battery anode active material which was obtained, in the same method as in Example 1, by drying the filtration residue at a high temperature after subjecting the slurry to filtration and washing with a rotary filter press, the absorption of metaphosphoric acid was confirmed. In addition, when the dry powder of the secondary battery anode active material was dissolved and analyzed by ICP in the same manner as described above, it was confirmed that 1.2% by mass of phosphorus and 0.75% by mass of calcium were present.

Furthermore, when the dry powder of the secondary battery anode active material was photographed with a scanning electron microscope and the average particle diameter of primary particles was determined in the same manner as described above, it was 0.015 μm.

In addition, as shown in Table 2, it became clear that the battery cell produced by using the secondary battery anode active material of Example 5 had an electrical capacitance of 218 (mAh/g (anode active material)) and that a large electrical capacitance was secured. Furthermore, in Example 5, the capacity retention rate after 100 cycles was 82%, which revealed that it was provided with excellent cycle characteristics.

Comparative Example 1

In Comparative Example 1, an anode active material for a secondary battery was formed to produce an anode for a secondary battery in the same manner as in Example 1 described above, with the exception that in the first stage, hydrolysis was carried out by adding the titanium-containing compound without the addition of phosphoric acid to pure water to prepare a slurry containing titanium oxide. Then, by using the anode for a secondary battery, a battery cell was produced in the same manner as in Example 1.

In addition, as a result of the analysis of the crystal phase of titanium dioxide in the same manner as in Example 1 by conducting X-ray diffraction on the secondary battery anode active material which was dried and was in the form of a powder, it was confirmed to be titanium dioxide that included an anatase-type crystal form. In addition, as a result of the FT-IR and ICP analyses of the dry powder of the secondary battery anode active material which was obtained, in the same method as in Example 1, by drying the filtration residue at a high temperature after subjecting the slurry to filtration and washing with a rotary filter press, it was confirmed that the detected amounts of both elemental phosphorus and alkaline earth metal (calcium) were significantly lower, as compared with those in Example 1. More specifically, they were 0.03% by mass for phosphorus and 0.06% by mass for calcium. It is thought that since phosphoric acid was not added initially at the time of preparing the slurry, the precipitated titanium dioxide aggregated and the primary particles increased in size, resulting in the reduction of surface activity due to the decrease in specific surface area, which made the reaction on the particle surfaces of the titanium dioxide less likely to occur in the aging process that followed, thereby reducing the coating efficiency of the condensed phosphate containing an alkaline earth metal to the surface of titanium dioxide particles.

Furthermore, when the dry powder of the secondary battery anode active material was photographed with a scanning electron microscope and the average particle diameter of primary particles was determined in the same manner as described above, it was 0.120 µm.

In addition, as shown in Table 2, when a battery cell was produced by using the secondary battery anode active material of Comparative Example 1, since the coating efficiency of the condensed phosphate containing an alkaline earth metal, in the secondary battery anode active material, to the surface of titanium dioxide particles was very low, the electrical capacitance was 181 (mAh/g (anode active material)), which was a small electrical capacitance compared to those in Examples 1 to 5 of the present invention. Further, in Comparative Example 1, the capacity retention rate after 100 cycles was 63%, which revealed that it was inferior in terms of cycle characteristics, as compared with Examples 1 to 5 of the present invention.

Comparative Example 2

In Comparative Example 2, with the exception that a commercially available titanium dioxide powder (product name: F-4, manufactured by Showa Denko K.K.) with no coating material on the surface was used for the anode active material for a secondary battery, an anode for a secondary battery was produced using this secondary battery anode active material by the same procedures and conditions as those in Example 1, and a battery cell was produced in the same manner by using the anode for a secondary battery.

In addition, as a result of the analysis of the crystal phase of titanium dioxide in the same manner as in Example 1 by conducting X-ray diffraction on the secondary battery anode active material which was dried and was in the form of a powder, it was confirmed to be titanium dioxide that included an anatase-type crystal form.

In addition, as a result of the FT-IR analysis of the dry powder of the secondary battery anode active material which was obtained, in the same method as in Example 1, by drying the filtration residue at a high temperature after subjecting the slurry to filtration and washing with a rotary filter press, the absorption spectrum of condensed phosphoric acid was not observed. In addition, when the dry powder of the secondary battery anode active material was dissolved and analyzed by ICP in the same manner as described above, neither the elemental phosphorus nor an alkaline earth metal was detected.

Furthermore, when the dry powder of the secondary battery anode active material was photographed with a scanning electron microscope and the average particle diameter of primary particles was determined in the same manner as described above, it was 0.031 µm.

In addition, as shown in Table 2, the battery cell produced by using the secondary battery anode active material of Comparative Example 2 had an electrical capacitance of 198 (mAh/g (anode active material)), which was a small electrical capacitance compared to those in Examples 1 to 5 of the present invention. Further, in Comparative Example 2, the capacity retention rate after 100 cycles was 30%, which revealed that it was significantly inferior in terms of cycle characteristics, as compared with Examples 1 to 5 of the present invention.

Comparative Example 3

In Comparative Example 3, with the exception that a commercially available titanium dioxide powder (product name: F-4S05, manufactured by Showa Denko K.K.) with a coating material in terms of 5% by mass of $SiO_2$ which was surface treated by using a silane coupling agent on the surface thereof was used for the anode active material for a secondary battery, an anode for a secondary battery was produced using this secondary battery anode active material by the same procedures and conditions as those in Example 1, and a battery cell was produced in the same manner by using the anode for a secondary battery.

In addition, as a result of the analysis of the crystal phase of titanium dioxide in the same manner as in Example 1 by conducting X-ray diffraction on the secondary battery anode active material, which was dried and was in the form of a powder, it was confirmed to be titanium dioxide that included an anatase-type crystal form.

In addition, as a result of the FT-IR analysis of the dry powder of the secondary battery anode active material which was obtained, in the same method as in Example 1, by drying the filtration residue at a high temperature after subjecting the slurry to filtration and washing with a rotary filter press, the absorption spectrum of condensed phosphoric acid was not observed. In addition, when the dry powder of the secondary battery anode active material was dissolved and analyzed by ICP in the same manner as described above, neither the elemental phosphorus nor an alkaline earth metal was detected.

Furthermore, when the dry powder of the secondary battery anode active material was photographed with a scanning electron microscope and the average particle diameter of primary particles was determined in the same manner as described above, it was 0.032 µm.

In addition, as shown in Table 2, in the battery cell produced by using the secondary battery anode active material of Comparative Example 3, since electrode exfoliation occurred, it was impossible to measure the electrical capacitance and the capacity retention rate. It is thought that since the secondary battery anode active material which was used in Comparative Example 3 was composed of a titanium dioxide powder with a coating material formed by a silane coupling agent on the surface thereof, the degree of adhesion to a metal foil was low, causing the electrode to detach.

From the results of Examples as described above, it became clear that by producing an anode active material for a secondary battery, in which the surface of titanium dioxide was coated with a condensed phosphate containing an alkaline earth metal, by the conditions specified in the present invention, an anode for a secondary battery produced using the same and a secondary battery using the same exhibited a large electrical capacitance and excellent cycle characteristics.

INDUSTRIAL APPLICABILITY

According to the method for producing an anode active material for a secondary battery of the present invention, it becomes possible to produce an anode active material for a secondary battery which is provided with a large electrical capacitance and excellent cycle characteristics. Therefore, the present invention is extremely useful industrially.

REFERENCE SIGNS LIST

1: Anode for secondary battery;
11: Metal foil;
12: Anode active material for secondary battery;
2: Cathode;
21: Current collector;
22: Cathode active material;
3: Separator;
4A, 4B: External packaging material;
A: Secondary battery

The invention claimed is:

1. An anode for a secondary battery comprising a layer including an anode active material laminated on a metal foil, wherein the anode active material is the anode active material for a secondary battery comprising a condensed phosphate containing an alkaline earth metal present on a surface of titanium dioxide, and elemental phosphorus and the alkaline earth metal are each contained in an amount of 0.1 to 10% by mass, with respect to the titanium dioxide.

2. The anode for a secondary battery according to claim 1, wherein the alkaline earth metal contained in the condensed phosphate is calcium or magnesium.

3. The anode for a secondary battery according to claim 1, wherein a number average particle size of primary particles of the titanium dioxide is in a range of 0.001 to 0.1 μm.

4. The anode for a secondary battery according to claim 1, wherein
the metal foil is an aluminum foil, and
a layer including the anode active material is formed on one or both sides of the aluminum foil.

5. A secondary battery comprising the anode for a secondary battery according to claim 1.

6. A method for producing an anode active material for a secondary battery, which is formed by coating a condensed phosphate containing an alkaline earth metal element on a surface of titanium dioxide, and contains 0.1 to 10% by mass of each of elemental phosphorus and the alkaline earth metal element with respect to the titanium dioxide, the method comprising:
a step of forming titanium dioxide by adding a titanium-containing compound to an acidic aqueous solution, to which phosphoric acid has been added, to carry out hydrolysis, and then adding a condensed phosphate and a compound containing an alkaline earth metal to the acidic aqueous solution, thereby coating a condensed phosphate containing an alkaline earth metal on the surface of the titanium dioxide.

7. The method for producing an anode active material for a secondary battery according to claim 6, wherein a pH of the acidic aqueous solution at the time of the hydrolysis is in the range of 0.1 to 4.

8. The method for producing an anode active material for a secondary battery according to claim 6, wherein a chloride is used as a compound containing the alkaline earth metal.

9. The method for producing an anode active material for a secondary battery according to claim 6, wherein
a liquid temperature at the time of adding the condensed phosphate and the compound containing the alkaline earth metal into the acidic aqueous solution, and coating a condensed phosphate containing an alkaline earth metal on particle surfaces of the titanium dioxide is in the range of 30 to 70° C.

10. A method for producing an anode for a secondary battery comprising, in this order:
producing an anode active material for a secondary battery; and
preparing a coating liquid by dispersing the anode active material for a secondary battery in a dispersion solvent, and applying and drying the coating liquid on one or both sides of a metal foil,
the anode active material is formed by coating a condensed phosphate containing an alkaline earth metal element on a surface of titanium dioxide, the anode active material containing 0.1 to 10% by mass of each of elemental phosphorus and the alkaline earth metal element with respect to the titanium dioxide, and
the method for producing the anode active material comprises forming titanium dioxide by adding a titanium-containing compound to an acidic aqueous solution, to which phosphoric acid has been added, to carry out hydrolysis, and then adding a condensed phosphate and a compound containing an alkaline earth metal to the acidic aqueous solution, thereby coating a condensed phosphate containing an alkaline earth metal on the surface of the titanium dioxide.

* * * * *